D. M. WEAVER.
DIRECTION INDICATOR FOR MOTOR VEHICLES.
APPLICATION FILED OCT. 3, 1921.
1,435,567.
Patented Nov. 14, 1922.
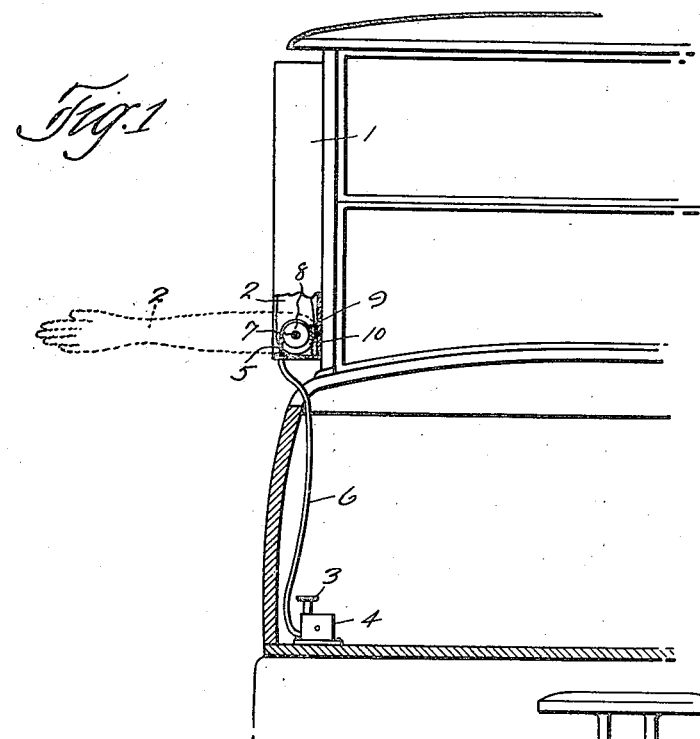
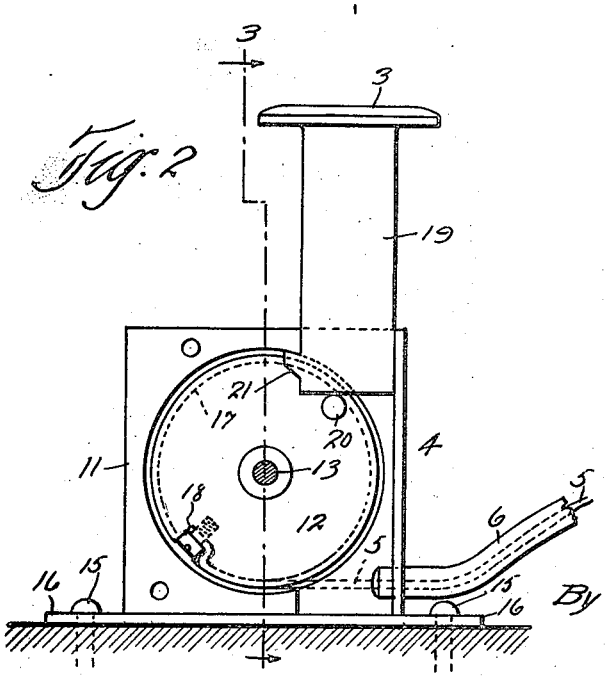
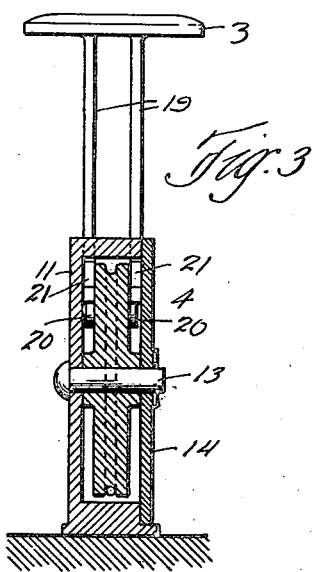
Inventor
Della May Weaver
By John A. Bommhardt
Atty Patented Nov. 14, 1922.                                                                1,435,567

UNITED STATES PATENT OFFICE.

DELLA MAY WEAVER, OF DETROIT, MICHIGAN.

DIRECTION INDICATOR FOR MOTOR VEHICLES.

Application filed October 3, 1921. Serial No. 504,999.

*To all whom it may concern:*

Be it known that I, DELLA MAY WEAVER, a citizen of the United States, residing at Detroit, in the county of Wayne and State of Michigan, have invented certain new and useful Improvements in Direction Indicators for Motor Vehicles, of which the following is a specification.

This invention relates to direction indicators for motor vehicles and the like, and is an improvement on the direction indicator shown in my Letters Patent No. 1371532, dated March 15, 1921.

Said patent discloses a device which includes a swinging arm which can be swung up or down to various positions, by the operation of a pedal or the like, to indicate intended movements of the car, and the object of the present invention is to provide improved means for operating said arm, as will more fully appear from the following description and the accompanying drawings.

In the drawings Fig. 1 is a broken elevation of the device applied to an automobile. Fig. 2 is a side elevation of the operating device, the front plate being removed. Fig. 3 is a section on the line 3—3 of Fig. 2.

Referring specifically to the drawings, 1 indicates a casing which may be attached to the windshield or otherwise mounted on the body of an automobile, and in this casing is pivotally mounted a signal arm 2 which is adapted to be swung up or down by the operation of a pedal 3 of an operating mechanism indicated as a whole at 4 which is attached to the foot board or any other convenient part of the car. A cable 5 extending through a flexible tube 6 connects the arm 2 with the operating device.

The arm 2 is hinged on a pin 7 at the lower end of the casing 1, and has a pulley or disk 8 attached thereto to which one end of the cable 5 is fastened as indicated at 9, the cable passing part way around the pulley. A spring 10 having one end attached to the pulley 8 and the other end attached to the casing 1 returns the arm 2 and the other parts to their normal position when the operating mechanism is released, the arm 2 in the normal position being swung up inside of the casing.

The operating mechanism comprises a casing 11 in which is a grooved wall 12 mounted on a pin 13. The casing has a removable front plate 14 and is attached to the car by screws 15 extending through feet 16 on the casing. The end of the cable 5 rides in the groove 17 in the wheel 12 and is fastened to said wheel by a screw 18. The pedal 3 has two legs 19 projecting downwardly therefrom and these legs work through slots in the top of the casing 11 and straddle the wheel 12, the lower ends of the legs resting on cylindrical lugs 20 projecting from opposite sides of the wheel 12. The legs 19 have projections 21 thereon against which the lugs 20 will stop and lock when said legs have been pushed down to the full extent.

In operation, by pressing down on the pedal, the legs 19 press down on the lugs 20 and turn the wheel 12 which winds the cable and swings the arm 2 outwardly and downwardly, where it is held by the lugs 20 riding off the lower ends of the legs 19 and engaging against the projections 21. To release the pedal, it is lifted to allow the lugs 20 to slip back under the legs 19, when the spring 10 will restore all parts to original position. Obviously the pedal can be pressed down more or less to swing the arm 2 to various angles in case local requirements necessitate different positions to indicate different intentions with respect to direction or speed. The device may be quickly and easily applied to existing vehicles, and will be found very serviceable for the intended purpose.

I claim:

1. The combination with a signal, of a cable connected at one end thereto, a wheel to which the other end of the cable is connected, said wheel having a projecting lug, and a pedal having a leg resting upon and supported by said lug and adapted when depressed to turn the wheel.

2. The combination with a signal, of a casing, a wheel therein having a projecting lug at the side thereof, a cable connection between the wheel and the signal, and a pedal having a leg working through an opening in the top of the casing and resting upon and supported by said lug to turn the wheel when the pedal is depressed.

3. The combination with a signal, of a casing, a wheel therein having a projecting lug at the side thereof, a cable connection between the wheel and the signal, and a pedal having a leg working through an opening in the top of the casing and resting upon said lug to turn the wheel when the pedal is depressed, said leg having a projection engageable with said lug to lock the wheel against movement when the pedal is fully depressed.

In testimony whereof, I affix my signature in presence of two witnesses.

DELLA MAY WEAVER.

Witnesses:
FLAVIUS J. FREEMAN,
FLOYD K. MILLER.